Figure 1:
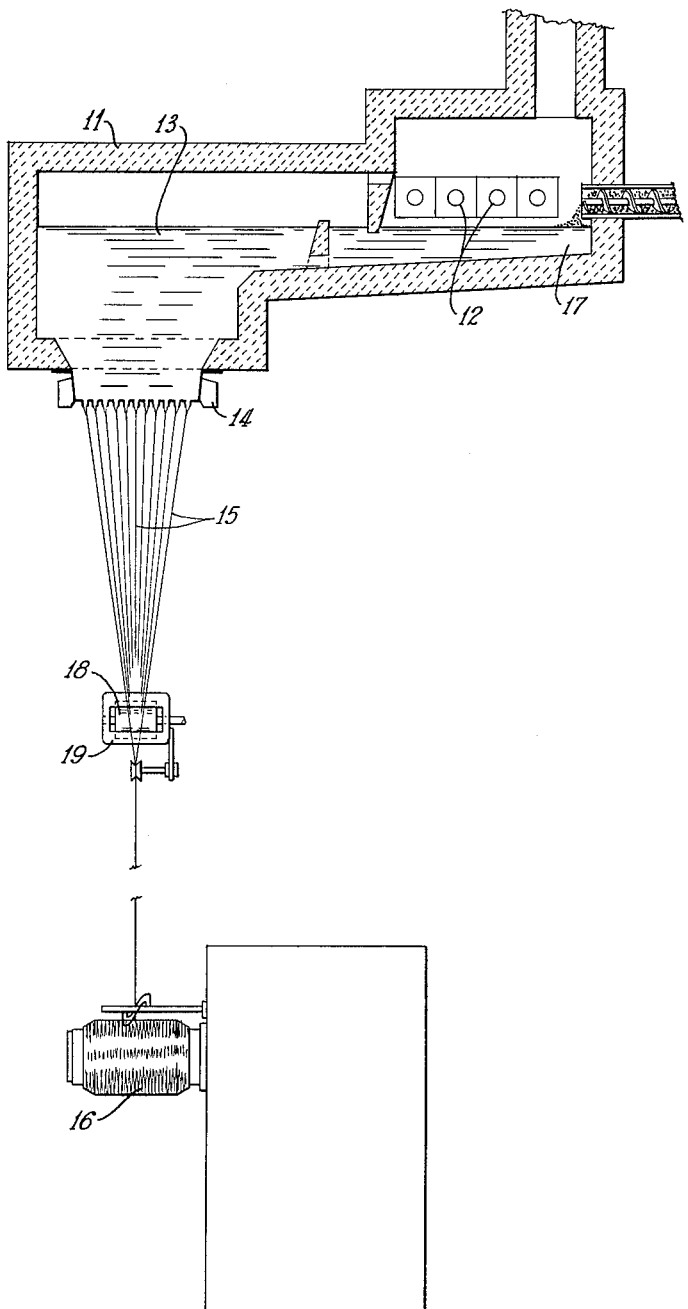

INVENTOR.
HELLMUT I. GLASER

United States Patent Office

3,239,369
Patented Mar. 8, 1966

3,239,369
CONTINUOUS SODIUM SILICATE FIBERS
Hellmut I. Glaser, Anderson, S.C., assignor to Owens-Corning Fiberglas Corporation, a corporation of Delaware
Filed July 28, 1961, Ser. No. 128,351
5 Claims. (Cl. 117—126)

The present invention relates to siliceous fibers and particularly to continuous sodium silicate fibers and methods for the production thereof.

In recent years, expanding demands for insulating or reinforcing materials which will withstand extreme conditions of temperature have led to a widespread utilization of silica fibers which will endure temperatures from −300° F. to +3000° F. To date, the most practical method for the preparation of such fibers has comprised the leaching of conventional glass fibers such as those fibers formed of an E glass composition. In this approach, a fiber consisting essentially of silica is obtained by extracting through leaching the monovalent, divalent and trivalent glass forming metal constituents. The fiber remaining after leaching may comprise as much as 99.9% by weight of silica. Such leaching is conventionally achieved by submerging the glass fibers in either an inorganic or organic acid and the leaching effect may be accelerated by simultaneously heating the leaching bath. This method is amply disclosed by U.S. 2,215,039, 2,221,709, 2,461,841, 2,491,761, 2,500,092, 2,624,658, 2,635,390, 2,686,954, 2,718,461 and 2,730,475.

However, the attainment of fibers possessing a high silica content by means of the described technique is attended by serious drawbacks. Not only is the process subject to large material losses in respect to the high percentage of metal oxides which are removed from the glass and which in the case of most fiberizable glasses such as E glass comprise approximately 40 to 50% by weight of the fiber, but in addition the resultant leached products undergo severe shrinking. The latter problem is particularly pronounced in the case of leached products comprising continuous fibers in the form of fabrics, roving and the like. At the same time, such continuous fiber products are particularly desirable due to their suitability for reinforcing applications such as filament winding and fabric or roving reinforcements such as lay-ups, pre-pregs, chopped roving and the like.

While an apparent solution to the shrinkage problem lies in the utilization of fibers having a higher silica content which consequently suffer a smaller weight loss upon leaching, this solution is not readily susceptible to reduction to practice. This situation stems from the fact that fibers having a high silica content, such as sodium silicate fibers, are rapidly degraded by moisture attack at atmospheric conditions, are extremely friable, and to date have not been amenable to commercial production in a continuous filament form.

It is an object of the present invention to provide continuous sodium silicate fibers.

A further object is the provision of durable sodium silicate fibers.

Another object is the provision of methods for the fabrication of continuous sodium silicate fibers.

An additional object is the provision of a batch composition from which continuous sodium silicate fibers may be attenuated.

Still another object is the provision of protective size compositions for sodium silicate fibers.

A still further object is the provision of silica fibers free from undue shrinkage upon leaching.

These and other objects and advantages of the invention will be more clearly explained and developed in the subsequent detailed description and in reference to the attached drawing which depicts a schematic view of a preferred method and apparatus for the melting, attenuating, coating and winding of the continuous sodium silicate fibers of the invention.

The foregoing objects are achieved by means of melting a batch composition comprising materials which yield at least 75% by weight of silica upon fusion, flowing the resultant molten material through orifices provided in a fiber forming bushing to form filaments, attenuating the filaments to form continuous fibers and immediately coating the fibers with a protective medium which serves to prevent moisture inspired degradation.

BATCH COMPOSITION

Although the invention is not to be limited thereto, the following glass composition is melted in accordance with the best known method of carrying out the invention.

| Ingredient: | Percent by wt. |
|---|---|
| $SiO_2$ | 69.6 |
| $Na_2SO_4$ | 2.0 |
| $Na_2CO_3$ | 28.4 |
| | 100.0 |

Any batch which yields fibers comprising 75% by weight or more of silica will also yield a satisfactory continuously fiberizable melt and fibers which do not undergo severe shrinkage upon leaching. In the melting of the above batch composition, the sulfates and carbonates are vaporized and dispelled to yield fibers comprising approximately 80% by weight of silica and 20% by weight of sodium oxide. The batch employed may be formulated to utilize or include metallic oxide fluxes or combinations of metallic oxides in addition to or in place of sodium oxide such as the oxides of lithium, potassium and boron, and the ratio of oxides or oxide forming metal compounds to silica may be decreased to yield a higher silica content when appropriate melting conditions and refractory or alloy bushings of adequate heat and erosion resistance are employed with conventional platinum bushings. However, if batches having a higher melting temperature are utilized, refractory or alloy materials having higher temperature and erosion resistance such as rhodium, may be employed in the fabrication of the bushing or melting tank.

FIBERIZATION

The fibers of the invention are formed by methods and apparatus which are conventional in the formation of glass fibers such as fibers formed from E glass and the fiber forming rate and yield is approximately the same as in the case of E glass fibers. For example, a yield of approximately 30 pounds of fibers per hour is obtained when fibers having a diameter of approximately 0.00035 to 0.00038 inch are attenuated from a conventional textile bushing provided with 408 fiber forming orifices. In addition, the fibers may be attenuated at conventional pulling or drawing rates of 8,000 to 15,000 feet per minute.

The apparatus employed in fiberizing is known in the art and is also schematically illustrated in the attached drawing which depicts a high temperature tank 11 which is preferably formed of platinum or a platinum lined refractory material, wherein the batch constituents are melted by means of gas burners 12 to provide a molten material 13 which is then flowed through orifices provided in a bushing tip section 14, attenuated into continuous fibers 15 and wound into a cylindrical package form 16.

While the drawing represents a simplified or basic form of the invention, it should be realized that the molten material 13 contained by the melting section of the tank 11, may be fed to a plurality of bushing tips 14 in order to provide a multiple forming arrangement comprising a central or common melter and a plurality of fiber-forming bushings.

With the depicted structure and the preferred batch composition, the batch is melted at a temperature between 2700 and 2800° F. in the region 17 where melting is achieved, and reaches the bushing tip section 14 at a temperature of approximately 2300 to 2400° F.

The heating means may also be widely varied and when a melter constructed entirely of platinum or a metal alloy is employed, integral portions of the melter may be utilized as electric current carrying members which generate the requisite heat. Alternatively, when a refractory or metal coated refractory material is employed in the fabrication of the bushing, other conventional heating means such as gas combustion may be utilized.

FORMING SIZE COMPOSITIONS

As previously stated, the fibers of the invention are subject to extensive attrition as the result of moisture degradation, if exposed to atmospheric conditions for even short periods of time. Consequently, a protective coating or film is applied to the fibers immediately subsequent to their formation, as shown by the drawing wherein the continuous fibers 15 are brought into contact with a transfer roll 18 which is supplied with the coating material by means of a reservoir 19.

While a graphite transfer roll 18 is the preferred applicator, other conventional contact, immersion or spray application methods and apparatus such as the apron applicator disclosed by U.S. 2,873,718, pad applicators as shown by U.S. 2,390,370, 2,744,563 and 2,778,764, sprays as disclosed by 2,491,889, 2,846,348 and 2,906,470, or other types of transfer rolls such as those disclosed by U.S. 2,693,429 and 2,742,737, may also be utilized.

New and unusual size compositions are also necessary to achieve the goals of the invention. To produce a satisfactorily durable and leachable fiber, a size composition which provides a continuous and uniform protective film capable of withstanding both moisture attack and the rigors of basic processing is required. In addition, the size composition must be applied in a substantially anhydrous form due to the deleterious effect of water upon the fibers. Furthermore, the size composition must be readily removable when the end use of the fibers entails leaching. In such instances, efficient processing requires that the protective coating be capable of ready removal by exposure to thermal conditions below the melting or softening point of the fibers, or by washing in a solvent or bath which decomposes, dispels or removes the size composition. While the size composition might be removed during actual leaching if a material soluble in or removable by the leaching composition is employed, it has been found that the deposition or precipitation of the ingredients of this size composition in the leaching medium serves to neutralize the leaching power of the medium and the necessity for removing such deposits or precipitates renders the process uneconomical. Accordingly, when leaching is contemplated the most desirable coating materials are those which may be easily and economically removed from the fibers prior to the leaching step. When the processing of the fibers does not entail leaching, a coating or size composition comprising a solution of a synthetic resin in an anhydrous solvent serves to yield durable fibers.

The preferred coating materials or forming size compositions of the invention comprise solutions of cereous compositions in anhydrous solvents. Such materials yield continuous protective films due to the solvent system which is employed as contrasted to conventional forming sizes which comprise aqueous emulsions of resinous particles. Still further, the sizes of the invention are readily removable by mild thermal, solvent or washing treatments and are preferably removed by means of immersion in a dilute acidic bath.

The term "cereous" as employed throughout the specification and claims is intended to connote, designate and encompass all true waxes and wax-like materials which are soluble in anhydrous solvents. This designation includes the esters of mono-, di- and polyhydroxy alcohols as well as fatty acids per se, alcohols, and higher hydrocarbons which are of a wax-like nature. Thus, in addition to true waxes comprising non-glyceryl esters formed from monohydroxy alcohols, the definition also includes the glycerol or polyhydroxy esters of fats and oils, natural waxes of plant or animal origin such as beeswax, scale insect waxes, wool, spermaceti, marine waxes, palm, candelilla, flax, cotton, sugar cane, Japan, myrtle and cranberry waxes; fossil, mineral, earth and lignite waxes such as algae, Utah, ozocerite, Montan, peat, brown coal and ceresin waxes; petroleum or hydrocarbon waxes such as paraffin, petrolatum, crystalline and microcrystalline waxes; synthetic waxes such as the phthalimides, chlorinated and stearamide waxes; and the fatty acids per se.

While stearic acid is a preferred coating material, other fatty or waxy acids such as oleic, palmitic, linoleic, linolenic, butyric, caproic, caprylic, capric, lauric, myristic, arachidic, behenic, erucic, and clupanodonic acid also yield highly satisfactory results. In selecting the cereous material to be employed, heed must also be paid to the ease with which it may be removed. For example, the elevated melting points of some of the microcrystalline waxes render them less susceptible to thermal removal than a material such as paraffin.

While 1,1,1-trichloroethane is a preferred solvent when stearic acid is employed as the solute, other solvents such as diacetone alcohol, carbon tetrachloride and the like are also operable. The 1,1,1-trichloroethane is preferred because of the fact that it possesses a flash point considerably above most similar solvents. This is an important factor because of the fact that coating is accomplished in close proximity to the high temperature fiber forming bushing or feeder and flammability and volatility are important considerations unless a thorough exhausting or ventilation of the forming area is practiced. In th event that highly flammable or toxic solvents are utilized in conjunction with the exhausting of the volatilized solvent, solvent recovery may also be conducted in order to improve the economics of the operation. Generally, the choice of the solvent will depend in great part upon a number of factors including the solubility characteristics of the solute selected, the hazards entailed in the utilization of the solvent, and the affect of the solvent upon the removal characteristics of the film if leaching is contemplated.

When the preferred formulation comprising stearic acid and 1,1,1-trichloroethane is utilized, the ingredients are preferably employed in the following proportional ranges which are expressed in percentages by weight:

| | Percent |
|---|---|
| Stearic acid | 2–25 |
| 1,1,1-trichloroethane | 75–98 |
| A preferred formulation comprises: | |
| Stearic acid | 7 |
| 1,1,1-trichloroethane | 93 |

If the strands of the invention are to be immediately twisted the above formulation is adequate. However, if storage prior to twisting is contemplated, the inclusion of a plasticizer in the formulation is advisable to prevent undue stiffness of the strands. Camphor has proved highly efficient in the plasticizer role. However, even with the use of a plasticizer some protection of the forming packages is desirable in order to retard the volatilization of the plasticizer. Storage of the forming packages in polyethylene bags has provided an adequate solution.

The efficacy of the size compositions of the invention is demonstrated not only by the fact that they make possible a practical process for the production of continuous sodium silicate fibers, but also by the durability of the product which is yielded. When such fibers were fabricated with a protective coating comprising an emulsion of a synthetic resin, the fibers were completely unprocessable. Within a matter of hours the fibers became so friable as to be incapable of removal from the wound cylindrical package and shortly thereafter the mere act of dropping the package resulted in the splitting of the fibers through their entire mass which had by then become an integral structure rather than grouped, adjacent fibers and strands. In contrast, a wound package of the sized fibers of the invention may be completely submerged in water for a period of 24 hours, and upon removal therefrom the strand may be readily unwound from the package.

In addition, the size compositions of the invention may be readily removed from the surfaces of the fibers and strands by means of immersion in a hot, dilute both of sulfuric acid or by a thermal treatment at 400° F. to provide an unprotected, leachable medium.

The strength and durability of the products of the invention is also aptly demonstrated by the fact that strands comprising a plurality of the fibers were twisted and woven into fabrics without undue difficulty. Not only was such processing impossible with previous sodium silicate fibers, but also the fabrics thus provided by the invention yield upon leaching, an ideal reinforcing medium for structures which are exposed to extreme temperatures such as rocket nose cones and the like. In addition, minimal shrinkage is experienced upon leaching. Further proof of the strength and durability of the fibers is provided by the following table which sets forth the tensile strengths of 27 fibers formed in accordance with the present invention:

| Fiber No. | Breaking Load (grams) | Breaking Stress (lb./sq. in.) |
|---|---|---|
| 1 | 6.5 | 203,000 |
| 2 | 5.0 | 156,000 |
| 3 | 6.5 | 203,000 |
| 4 | 8.6 | 250,000 |
| 5 | 4.0 | 281,000 |
| 6 | 6.0 | 187,000 |
| 7 | 7.5 | 234,000 |
| 8 | 5.0 | 156,000 |
| 9 | 4.0 | 125,000 |
| 10 | 7.0 | 218,000 |
| 11 | 6.0 | 187,000 |
| 12 | 5.5 | 172,000 |
| 13 | 4.0 | 125,000 |
| 14 | 6.0 | 187,000 |
| 15 | 4.5 | 140,000 |
| 16 | 6.0 | 187,000 |
| 17 | 6.0 | 187,000 |
| 18 | 5.5 | 172,000 |
| 19 | 5.5 | 172,000 |
| 20 | 5.0 | 156,000 |
| 21 | 6.0 | 187,000 |
| 22 | 3.0 | 94,000 |
| 23 | 5.0 | 156,000 |
| 24 | 6.5 | 203,000 |
| 25 | 7.0 | 218,000 |
| 26 | 6.5 | 203,000 |
| 27 | 6.5 | 203,000 |
| Average | 5.7 | 184,000 |

While the fibers of the invention are primarily intended as leachable and processable intermediates to be employed as reinforcements or insulation for applications which experience extreme conditions of temperature, they may also be employed in electrical or optical applications since their electrical and optical characteristics are very similar to those of quartz fibers. Consequently, oriented light may be transmitted through one or more of the fibers of the invention. In applications which do not entail leaching, a more durable size composition in the form of an anhydrous resinous solution may be desirable. For example, solutions comprising 2-15% by weight of epoxy resins in 85-98% by weight of diacetone alcohol or trichloroethane have yielded fibers of excellent durability. Coatings of the latter type are not desirable upon fibers to be subjected to leaching however, due to the difficulty involved in removing such coatings either before or during leaching.

It is apparent that novel fibers and methods for their formation and sizing as well as unusual leached structures and size compositions are provided by the present invention.

It is further obvious that various changes, alterations and substitutions may be made in the compositions, methods and products of the present invention without departing from the spirit of the invention as defined by the following claims.

I claim:

1. A silicate fiber comprising a continuous filament consisting essentially of at least 75% by weight of silica and an oxide of a metal selected from the group consisting of sodium, lithium, potassium and boron, and a coating upon said fiber which comprises the dried residue of a solution of a cereous material in an anhydrous solvent.

2. A fiber as described in claim 1 in which said cereous material is a fatty acid.

3. A fiber as described in claim 1 in which said anhydrous solvent is 1,1,1-trichloroethane.

4. A fiber as described in claim 1 in which said coating comprises the dried residue of a solution consisting essentially of between 2 to 25% by weight of stearic acid and between 75 to 98% by weight of 1,1,1-trichloroethane.

5. A strand comprising a plurality of substantially parallel continuous filaments consisting essentially of at least 75% by weight of silica, and an oxide of a metal selected from the group consisting of sodium, lithium, potassium and boron, and a coating consisting essentially of the dried residue of an anhydrous solution of a cereous material upon the surfaces of said filaments.

References Cited by the Examiner

UNITED STATES PATENTS

| | | | |
|---|---|---|---|
| 2,272,588 | 2/1942 | Simison | 18—54 |
| 2,457,775 | 12/1948 | Ebaugh | 18—54 |
| 2,670,303 | 2/1954 | Mailander | 106—271 |
| 2,842,455 | 7/1958 | Young et al. | 106—271 |
| 2,920,981 | 1/1960 | Whitehurst | 117—126 |
| 2,946,698 | 7/1960 | Brunnick et al. | 117—126 |
| 2,978,341 | 4/1961 | Bastian et al. | 106—50 |
| 3,092,531 | 6/1963 | Labino | 106—50 |

DONALD W. PARKER, *Primary Examiner.*

RUSSELL C. MADER, MERVIN STEIN, *Examiners.*